(12) United States Patent
Yang et al.

(10) Patent No.: US 12,273,036 B2
(45) Date of Patent: Apr. 8, 2025

(54) SWITCHING MODE POWER SUPPLY (71) Applicant: LS ELECTRIC CO., LTD., Anyang-si (KR)

(72) Inventors: Chun Suk Yang, Anyang-si (KR); Deok Young Lim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 199 days.

(21) Appl. No.: 17/909,602

(22) PCT Filed: Feb. 25, 2021

(86) PCT No.: PCT/KR2021/002363
§ 371 (c)(1),
(2) Date: Sep. 6, 2022

(87) PCT Pub. No.: WO2021/177655
PCT Pub. Date: Sep. 10, 2021

(65) Prior Publication Data
US 2023/0104318 A1    Apr. 6, 2023

(30) Foreign Application Priority Data
Mar. 4, 2020  (KR) .................. 10-2020-0027033

(51) Int. Cl.
*H02M 3/335* (2006.01)
*H02M 1/00* (2006.01)
*H02M 1/34* (2007.01)

(52) U.S. Cl.
CPC ..... *H02M 3/33523* (2013.01); *H02M 1/0025* (2021.05); *H02M 3/33561* (2013.01); *H02M 1/34* (2013.01)

(58) Field of Classification Search
CPC ......... H02M 3/33523; H02M 3/33561; H02M 1/0025; H02M 1/34
(Continued)

(56) References Cited

U.S. PATENT DOCUMENTS 6,952,355 B2 * 10/2005 Riggio ................ H02M 1/4225
363/21.18
2008/0266910 A1 * 10/2008 Kim .................. H02M 3/33561
363/21.14
(Continued)

FOREIGN PATENT DOCUMENTS

EP        2590288 B1    11/2012
FR        0778659 B1 *  11/1996  .............. H02M 3/28
(Continued)

OTHER PUBLICATIONS

International Search Report for related International Application No. PCT/KR2021/002363; report dated Sep. 10, 2021; (5 pages).
(Continued)

*Primary Examiner* — Yemane Mehari
(74) *Attorney, Agent, or Firm* — K&L Gates LLP (57) ABSTRACT

The present disclosure provides a switching mode power supply including a feedback circuit unit receiving one of the output voltages as feedback and calculating a compensation voltage for constantly controlling the output voltages, a control unit controlling on/off a duty ratio of the semiconductor switch conducting or cutting off the input circuit according to the compensation voltage, and a protection circuit unit receiving one of the plurality of output voltages to determine whether the feedback circuit unit fails and configured to cut off power of to the control unit when the feedback circuit fails.

7 Claims, 5 Drawing Sheets

(58) Field of Classification Search
USPC .................................................. 363/21.12
See application file for complete search history.

(56) References Cited

U.S. PATENT DOCUMENTS

| | | | |
|---|---|---|---|
| 2010/0118566 A1* | 5/2010 | Kwon | H02M 3/33561 363/21.09 |
| 2014/0197739 A1* | 7/2014 | Lu | H05B 45/50 315/122 |
| 2015/0229149 A1 | 8/2015 | Fahlenkamp et al. | |
| 2018/0205320 A1 | 7/2018 | Galloway | |
| 2019/0207507 A1* | 7/2019 | Nonaka | H02M 3/33523 |

FOREIGN PATENT DOCUMENTS

| | | | |
|---|---|---|---|
| JP | 2009182117 A | 8/2009 | |
| KR | 20080090004 A | 10/2008 | |
| KR | 20080112704 A | 12/2008 | |
| KR | 101213696 B1 | 12/2012 | |

OTHER PUBLICATIONS

Written Opinion for related International Application No. PCT/KR2021/002363; report dated Sep. 10, 2021; (5 pages).
Supplementary Search Report for related European Application No. 21764558.9; action dated Mar. 21, 2024; (11 pages).

* cited by examiner

SWITCHING MODE POWER SUPPLY

CROSS-REFERENCE TO RELATED APPLICATION

The present application is a National Stage of International Application No. PCT/KR2020/002363 filed on Feb. 25, 2021, which claims priority to and the benefit of Korean Utility Model Application No. 10-2020-0027033, filed on Mar. 4, 2020, the disclosure of which is incorporated herein by reference in its entirety.

FIELD

The present disclosure relates to a switching mode power supply.

BACKGROUND

An inverter is a power conversion device that receives commercial alternating current (AC) power, converts it into direct current (DC), and then converts it back into AC for supply to a motor. Such inverters are used in various applications such as fans, pumps, elevators, conveying devices, and production lines throughout the industry.

Typically, an inverter includes circuits for communication, protection, and control as well as a circuit for performing a power conversion function. Accordingly, in order to operate these circuits, it is necessary to stably supply a voltage suitable for the rating of each circuit and, for this, the inverter includes a switching mode power supply (SMPS).

Considering that the switching mode power supply is a device responsible for supplying power to a control unit that controls the entire inverter and circuits that perform other significant functions, any problem occurring in the operation of the switching mode power supply may cause a significant effect on the main operation of the inverter.

In particular, an unexpected switching mode power supply failure may excessively increase the output voltage, and the heat generated by the increase in the output voltage is likely to damage the inverter.

SUMMARY

It is an object of the present disclosure to provide a switching mode power supply that is capable of preventing an inverter from being damaged by avoiding excessive increase of output voltage in such a way of cutting off, when a feedback circuit unit fails, the power to the controller.

The technical objects of the present disclosure are not limited to the aforesaid, and other objects not described herein with be clearly understood by those skilled in the art from the descriptions below.

In order to solve the above problems, the present disclosure provides a switching mode power supply including a primary circuit unit including an input circuit proving an input voltage and a semiconductor switch conducting or cutting off the input circuit, a transformer comprising a primary winding connected to the primary circuit unit and a plurality of secondary windings magnetically connected to the primary winding, a plurality of secondary circuit units respectively connected to the plurality of secondary windings and supplying a plurality of output voltages, a feedback circuit unit receiving one of the plurality of output voltages as feedback and calculating a compensation voltage for constantly controlling the output voltages, a control unit controlling on/off an duty ratio of the semiconductor switch according to the compensation voltage, and a protection circuit unit receiving one of the plurality of output voltages to determine whether the feedback circuit unit fails and to cut off, when the feedback circuit fails, power of the control unit.

Here, the transformer includes a bias winding magnetically connected to the plurality of secondary windings.

Also, the control unit, the feedback circuit unit, and the protection circuit unit are electrically connected to the bias winding to receive biased voltage induced from the secondary windings to the bias winding.

Also, the protection circuit unit connects, when the feedback circuit unit fails, the power of the protection circuit unit to ground.

Also, the protection circuit unit determines, when the output voltage received as feedback is equal to or greater than a reference voltage, that the feedback circuit unit fails.

Also, the feedback circuit unit includes a first sensing unit detecting the output power received as feedback, and a calculation unit optically connected to the first sensing unit to receive the output power from the first sensing unit.

Also, the calculation unit calculates the compensation voltage corresponding to difference between the output voltage and a target voltage.

Also, the control unit decrease the on/off duty ratio as the compensation voltage increases.

Also, the reference voltage is set to be greater than the target voltage. Here, the protection circuit unit includes a second sensing unit detecting the output voltage received as feedback, and a determination unit optically connected to the second sensing unit to receive the output voltage from the second sensing unit.

The present disclosure is advantageous in terms of preventing an inverter from being damaged by avoiding excessive increase of output power in such a way of cutting off, when the feedback circuit unit fails, the power to the controller.

The advantages of the present disclosure are not limited to the aforesaid, and other advantages not described herein may be clearly understood by those skilled in the art from the descriptions below.

DETAILED DESCRIPTION

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Thus, it should be understood that there may be various equivalents and modified examples that can replace the embodiments described in the present specification and the configuration shown in the drawings at the time of filing the present application.

Hereinafter, embodiments of the present disclosure will be described in detail with reference to accompanying drawings in order for those skilled in the art to easily practice the disclosure.

Figure 1:
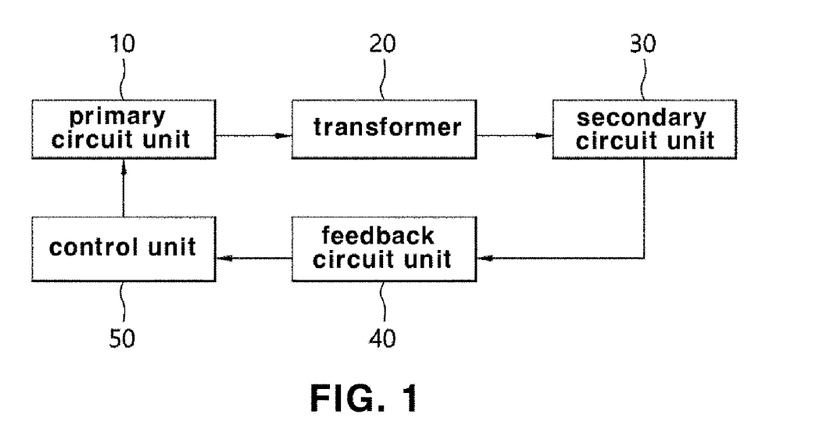
FIG. 1 is a schematic block diagram illustrating a conventional switching mode power supply.
Figure 2:
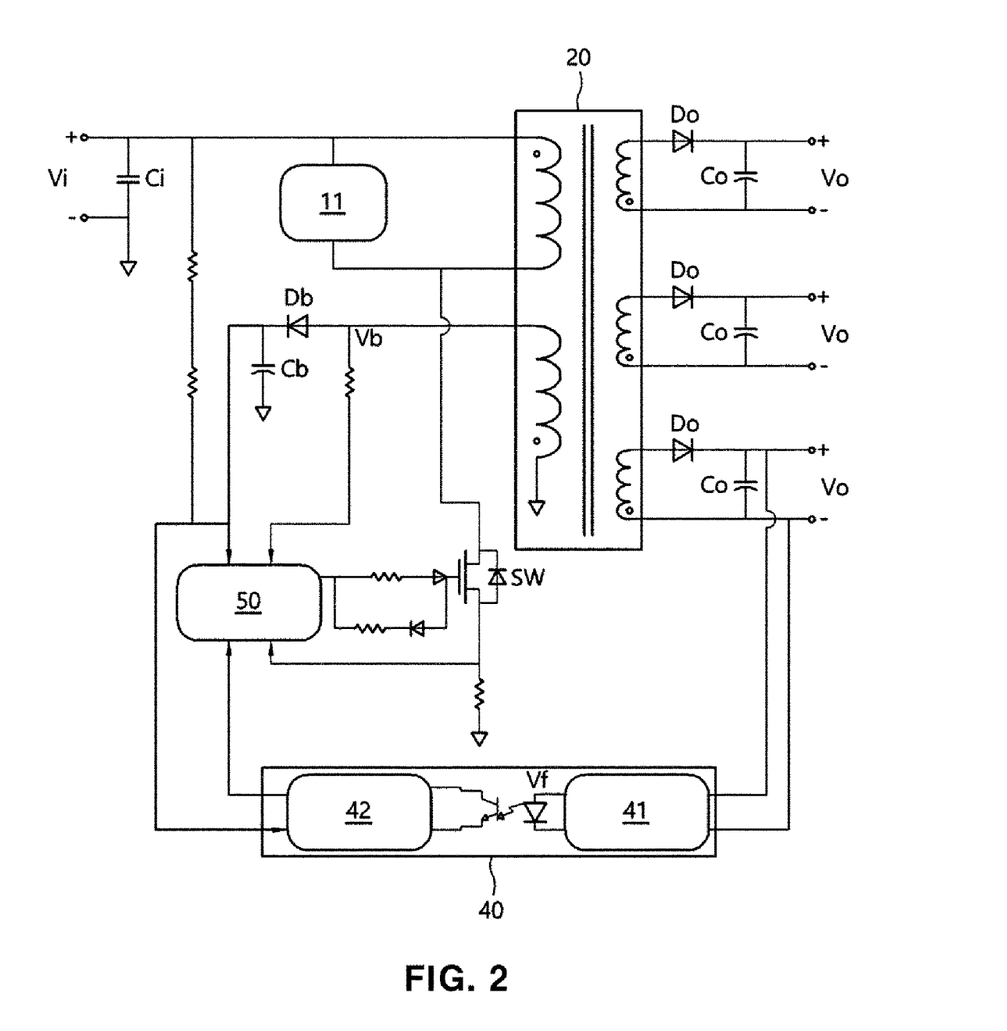
FIG. 2 is a detailed circuit diagram illustrating a conventional switching mode power supply.

FIG. 1 is a schematic block diagram illustrating a conventional switching mode power supply, and FIG. 2 is a detailed circuit diagram illustrating the conventional switching mode power supply.

As shown in FIGS. 1 and 2, the conventional switching mode power supply may include a primary circuit unit 10, a transformer 20, a plurality of secondary circuit units 30, a feedback circuit unit 40, and a control unit 50.

The primary circuit unit 10 includes an input circuit for providing an input voltage Vi and a semiconductor switch SW for conducting or cutting off the input circuit.

The input circuit may include an input terminal receiving the input voltage Vi from a commercial AC power source, an output terminal connected to a primary winding of the transformer 20, an input capacitor Ci connected to the input terminal, and a snubber circuit 11 connected in parallel with the primary winding of the transformer 20.

Here, when the input voltage Vi is input to the input terminal, a DC component included in the input voltage Vi is rectified by the input capacitor Ci and applied to the primary winding of the transformer 20. Here, the input voltage Vi is applied or cut off to the primary winding of the transformer 20 under the on/off control of the semiconductor switch SW. In addition, the snubber circuit 11 serves to suppress overvoltage generated when the semiconductor switch is switched.

The conventional switching mode power supply adopts a Fly-Back Topology. In detail, when the semiconductor switch SW is turned on (Turn-On), the input circuit is conductive; when the semiconductor switch SW is turned off (Turn-Off), the input circuit is cut off. Also, when the semiconductor switch SW is on, electrical energy is stored in the primary winding of the transformer 20; when the semiconductor switch SW is off, the electrical energy stored in the primary winding of the transformer 20 is transmitted to the secondary winding of the transformer 20.

Here, the transformer 20 may operate as a coupling inductor to obtain a stable output voltage.

The transformer 20 includes a primary winding connected to the primary circuit unit 10 and a plurality of secondary windings magnetically connected to the primary winding. Here, when the input voltage Vi is applied to the primary winding, an inductive voltage is induced to the plurality of second windings, respectively.

The plurality of secondary circuit units 30 are respectively connected to the plurality of secondary windings to supply a plurality of output voltages Vo. Here, the plurality of output voltages may differ in voltage level.

In detail, each of the plurality of secondary circuit units 30 includes an output diode Do connected in series with each of the plurality of secondary windings to rectify the induced voltage and an output capacitor Co connected in parallel to each of the secondary windings to smooth the induced voltage. Here, the plurality of secondary circuit unit 30 are not interlocked with each other and operate independently.

The feedback circuit unit 40 receives one of the plurality of output voltages as feedback and calculates a compensation voltage for constantly controlling the output voltages Vo.

In detail, the feedback circuit unit 40 includes a sensing unit 41 for detecting a feedback output voltage (hereinafter, a feedback voltage Vf) and a calculation unit 42 optically connected to the sensing unit 41 for receiving the feedback voltage Vf from the sensing unit 41.

The feedback circuit unit 40 may remove noise in such a way that the calculation unit 42 receives the feedback voltage Vf from the sensing unit 41 through an optical connection.

The calculation unit 42 may calculate a compensation voltage corresponding to the difference between the feedback voltage Vf and a target voltage. Here, the target voltage may be preset as a voltage required by the load.

The control unit 50 controls the on/off duty ratio of the semiconductor switch SW according to the compensation voltage calculated by the feedback circuit unit 40. For example, the control unit 50 may increase the on/off duty ratio when the feedback voltage Vf is lower than the target voltage, and decrease the on/off duty ratio when the feedback voltage Vf is higher than the target voltage.

This makes it possible for the output voltage to follow the target voltage, thereby keeping the output voltage Vo constant.

The transformer 20 further includes a bias winding magnetically connected to the plurality of secondary windings. Here, the controller 50 receives the bias voltage Vb induced from the secondary winding to the bias winding as a power source.

To this end, the conventional switching mode power supply includes a diode Db connected in series with the bias winding to rectify the bias voltage Vb and a bias capacitor Cb connected in parallel with the bias winding to smooth the bias voltage Vb.

Here, the bias voltage Vb may be supplied to the feedback circuit unit 40 as a power source.

Meanwhile, a failure occurring in the feedback circuit unit 40 may cause the output voltage Vo to fail following the target voltage and thus excessively increase, and this means that the heat produced by the excessive voltage may damage the inverter.

Figure 3:
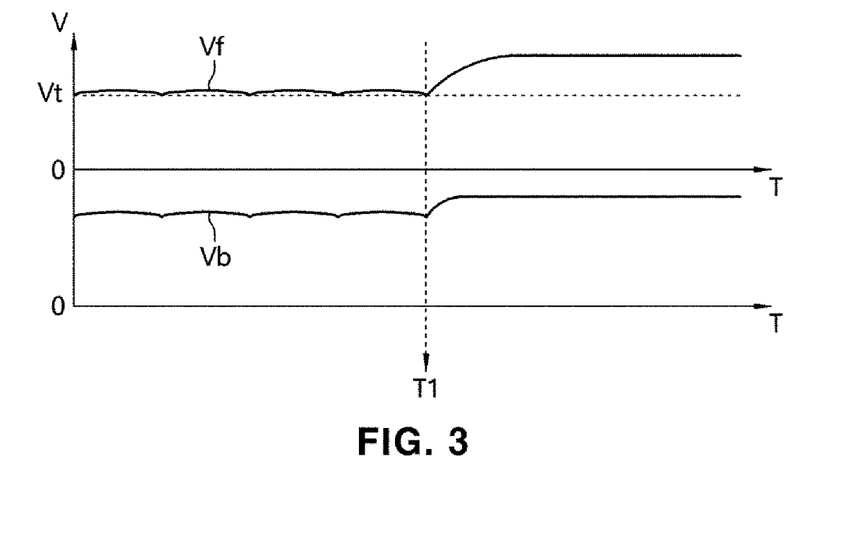
FIG. 3 is a graph illustrating changes in feedback voltage and bias voltage when the feedback circuit unit of FIGS. 1 and 2 fails.

FIG. 3 is a graph illustrating changes in feedback voltage and bias voltage when the feedback circuit unit of FIGS. 1 and 2 fails. Here, the horizontal axis represents time T, the vertical axis represents voltage V, and T1 represents a time point at which a failure occurs in the feedback circuit unit 40.

In FIG. 3, it is possible to observe that the feedback voltage Vf (=output voltage Vo), which is kept constant following the target voltage Vt before T1 until which the feedback circuit unit 40 operates normally, rises at the time point T1 where the feedback circuit unit 40 fails.

It is also possible to observe that the bias voltage Vb (=power source of the control unit), which is kept constant along with the constant output power Vo before T1 until which the feedback circuit unit 40 operates normally, rises too due to the increased output voltage Vo at T1 where the feedback circuit unit 40 fails.

Such an excessive increase of the output voltage Vo caused by the failure occurring in the feedback circuit unit 40 may produce overheat, thereby damaging the inverter.

Figure 4:
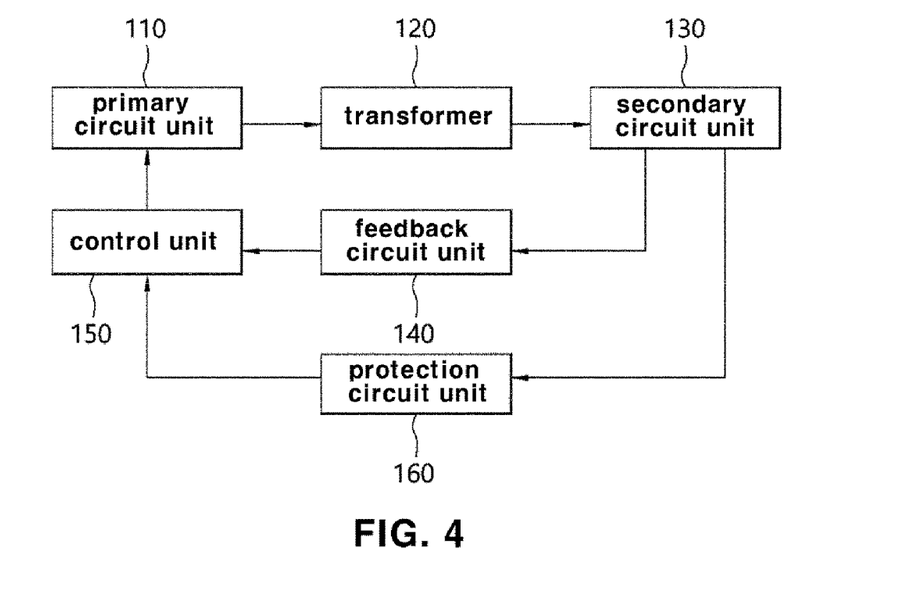
FIG. 4 is a schematic block diagram illustrating a switching mode power supply according to an embodiment of the present disclosure.
Figure 5:
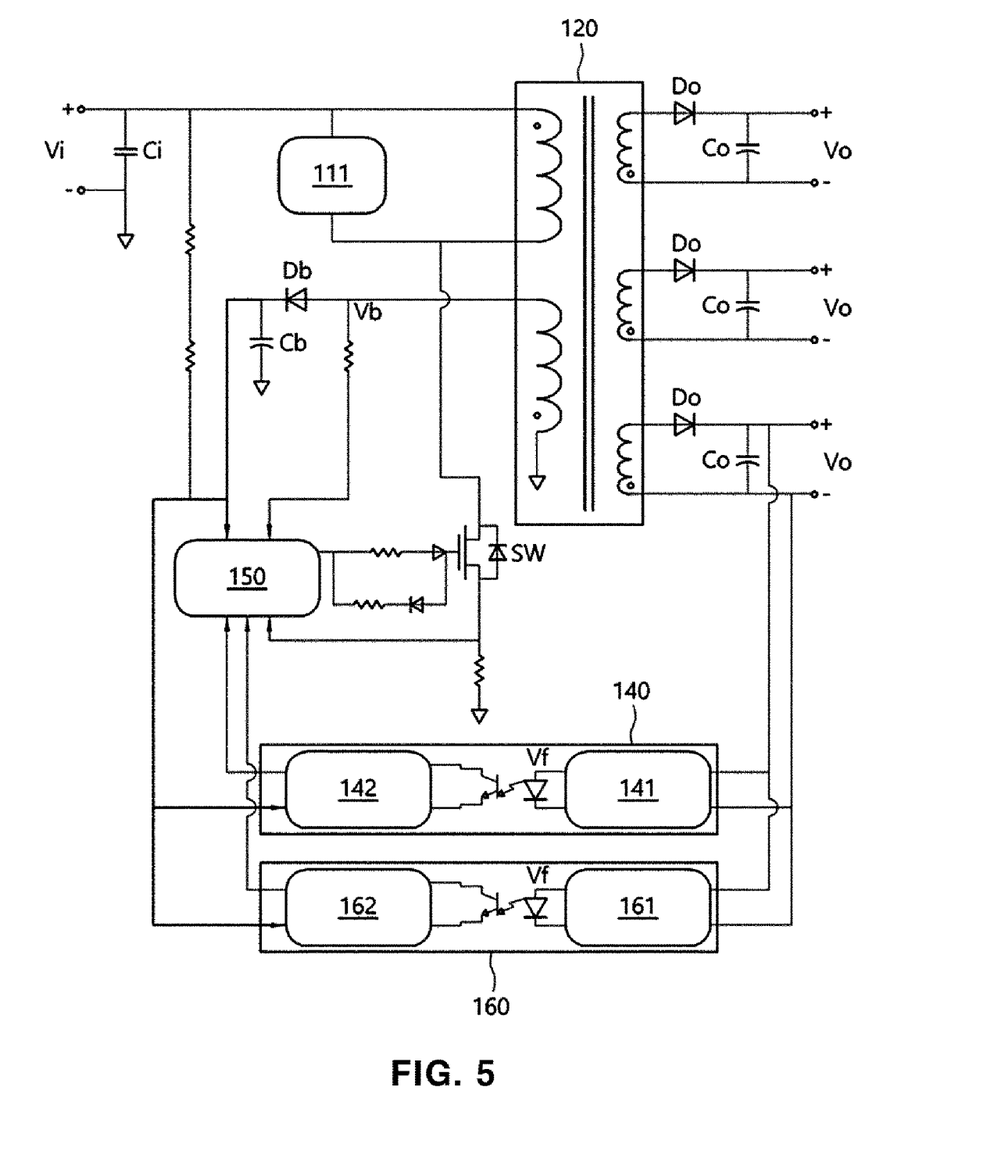
FIG. 5 is a detailed circuit diagram illustrating a switching mode power supply according to an embodiment of the present disclosure.

FIG. 4 is a schematic block diagram illustrating a an switching mode power supply according to an embodiment of the present disclosure, and FIG. 5 is a detailed circuit diagram illustrating an switching mode power supply according to an embodiment of the present disclosure.

As shown in FIGS. 4 and 5, the switching mode power supply according to an embodiment of the present disclosure may include a primary circuit unit 110, a transformer 120, a plurality of secondary circuit units 130, a control unit 150, and a protection unit 160.

The primary circuit unit 110 includes an input circuit for providing an input voltage Vi and a semiconductor switch SW for conducing or cutting off the input circuit.

The input circuit may include an input terminal receiving the input voltage Vi from a commercial AC power source, an output terminal connected to a primary winding of the transformer 120, an input capacitor Ci connected to the input terminal, and a snubber circuit 111 connected in parallel with the primary winding of the transformer 120.

Here, when the input voltage Vi is input to the input terminal, a DC component included in the input voltage Vi is rectified by the input capacitor Ci and applied to the primary winding of the transformer 120. Here, the input voltage Vi is applied or cut off to the primary winding of the transformer 120 under the on/off control of the semiconductor switch SW. In addition, the snubber circuit 111 serves to suppress overvoltage generated when the semiconductor switch is switched.

The switching mode power supply according to an embodiment of the present disclosure adopts a Fly-Back Topology. In detail, the input circuit is, when the semiconductor switch SW is turned on (Turn-On), conductive and, when the semiconductor switch SW is turned off (Turn-Off), cut off. Also, electrical energy is stored in the primary winding of the transformer 120 when the semiconductor switch SW is on, and the electrical energy stored in the primary winding of the transformer 120 is transmitted to the secondary winding of the transformer 120 when the semiconductor switch SW is off.

Here, the transformer 120 may operate as a coupling inductor to obtain a stable output voltage.

The transformer 120 includes a primary winding connected to the primary circuit unit 110 and a plurality of secondary windings magnetically connected to the primary winding. Here, when the input voltage Vi is applied to the primary winding, an inductive voltage is induced to the plurality of second windings, respectively.

The plurality of secondary circuit units 130 are respectively connected to the plurality of secondary windings to supply a plurality of output voltages Vo. Here, the plurality of output voltages may differ in voltage level.

In detail, each of the plurality of secondary circuit units 130 includes an output diode Do connected in series to each of the plurality of secondary windings to rectify the induced voltage and an output capacitor Co connected in parallel to each of the secondary windings to smooth the induced voltage. Here, the plurality of secondary circuit unit 130 are not interlocked with each other and operate independently.

The feedback circuit unit 140 receives one of the plurality of output voltages as feedback and calculates a compensation voltage for constantly controlling the output voltages Vo.

In detail, the feedback circuit unit 140 includes a first sensing unit 141 for sensing a feedback output voltage (hereinafter, a feedback voltage Vf) and a calculation unit 142 optically connected to the first sensing unit 141 for receiving the feedback voltage Vf from the first sensing unit 141.

The feedback circuit unit 140 may remove noise in such a way that the calculation unit 142 receives the feedback voltage Vf from the first sensing unit 141 through an optical connection.

The calculation unit 142 may calculate a compensation voltage corresponding to the difference between the feedback voltage Vf and a target voltage. Here, the target voltage may be preset as a voltage required by the load.

The control unit 150 controls the on/off duty ratio of the semiconductor switch SW according to the compensation voltage calculated by the feedback circuit unit 140. For example, the control unit 150 may increase the on/off duty ratio when the feedback voltage Vf is lower than the target voltage and may decrease the on/off duty ratio when the feedback voltage Vf is higher than the target voltage.

This makes it possible for the output voltage to follow the target voltage, thereby keeping the output voltage Vo constant.

The transformer 120 further includes a bias winding magnetically connected to the plurality of secondary windings. Here, the feedback circuit unit 140, the control unit 150, and the protection circuit unit 160 are electrically connected to the bias winding to receive the bias voltage Vb induced from the secondary winding to the bias winding as a power source.

To this end, the switching mode power supply according to an embodiment of the present disclosure includes a diode Db connected in series with the bias winding to rectify the bias voltage Vb and a bias capacitor Cb connected in parallel with the bias winding to smooth the bias voltage Vb.

Here, the bias voltage Vb may be supplied to the feedback circuit unit 140 as a power source.

Meanwhile, a failure occurring in the feedback circuit unit 140 may cause the output voltage Vo to fail following the target voltage and thus excessively increase, and this means that the heat produced by the excessive voltage may damage the inverter.

In order to solve the above problem, the protection circuit unit 160 receives one of the plurality of output voltages as feedback to determine whether the feedback circuit unit 140 has a failure and, when the feedback circuit unit 10 fails, cuts off the power to the control unit 150. That is, when the feedback circuit unit 140 fails, the protection circuit unit 160 connects the power of the control unit 150 to the ground by connecting the power of the protection circuit unit 160 to the ground.

Therefore, the power of the control unit 150 is lowered to turn off the control unit 150, resulting in shutdown of the switching mode power supply. This makes it possible to prevent the inverter from being damaged by avoiding excessive increase of the output power.

In detail, the feedback circuit unit 160 includes a second sensing unit 161 for sensing a feedback output voltage and a determination unit 162 optically connected to the second sensing unit 161 for receiving the feedback voltage Vf from the second sensing unit 161.

The protection circuit unit 160 may remove noise in such a way that the determination unit 162 receives the feedback voltage Vf from the second sensing unit 161 through an optical connection.

The determination unit 162 determines that the feedback circuit unit 140 has failed when the feedback voltage Vf is equal to or greater than a reference voltage, and determines that the feedback circuit unit 140 is normal when the feedback voltage Vf is less than the reference voltage.

Here, it is preferred that the reference voltage is set to be greater than the target voltage in order for the protection circuit unit 160 not to operate when the feedback circuit unit 140 is in a normal state.

Figure 6:
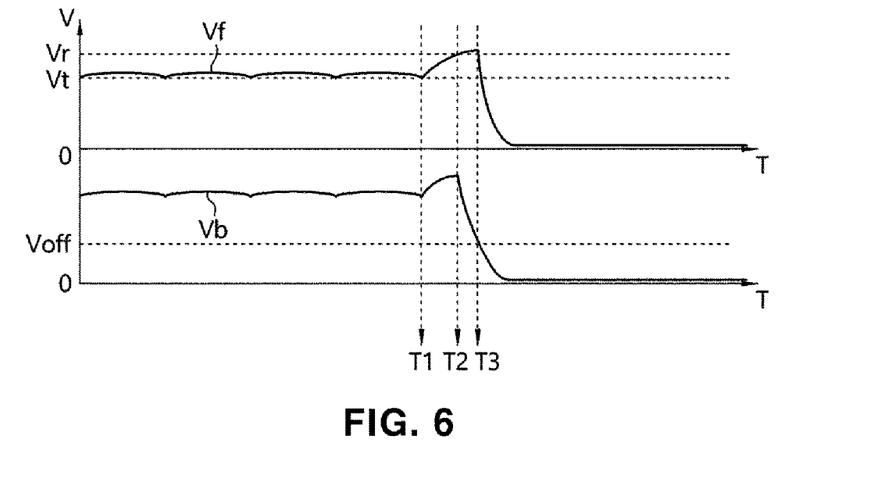
FIG. 6 is a graph illustrating changes in feedback voltage and bias voltage when the feedback circuit unit of FIGS. 4 and 5 fails.

FIG. 6 is a graph illustrating changes in feedback voltage and bias voltage when the feedback circuit unit of FIGS. 4 and 5 fails. Here, the horizontal axis represents time T, the vertical axis represents voltage V, and T1 represents a time point at which a failure occurs in the feedback circuit unit 140.

In FIG. 6, it is possible to observe that the feedback voltage Vf (=output voltage Vo), which is kept constant following the target voltage Vt before T1 until which the feedback circuit unit 140 operates normally, rises at the time point T1 where the feedback circuit unit 140 fails.

It is also possible to observe that the bias voltage Vb (=power source of the control unit 150), which is kept constant along with the constant output power Vo before T1 until which the feedback circuit unit 140 operates normally, rises too due to the increased output voltage Vo at T1 where the feedback circuit unit 140 fails.

Afterward, the protection circuit unit 160 operates at a time T2 when the feedback voltage Vf becomes the reference voltage Vr. That is, the protection circuit unit 160 sinks the bias voltage Vb to the ground at time T2. Then, the bias voltage Vb gradually decreases to converge to 0V. The feedback voltage Vf does not immediately decrease at the time T2 due to the output capacitor Co but decreases, from the time T3 when the bias voltage Vb becomes the off voltage Voff of the control unit 150, to converges to 0V.

In this way, it is possible to prevent the inverter from being damaged by the heat caused by excessive increase of the output power Vo in such a way that the protection circuit unit 160 cuts off the power to the control unit 150 upon detection of the failure of the feedback circuit unit 140.

The description detailed above is illustrative of the present disclosure. In addition, the above-described description merely illustrates and describes preferred embodiments of the present disclosure, and the present disclosure can be used in various other combinations, changes, and environments. That is, changes or modifications are possible within the scope of the concept of the disclosure disclosed herein, the scope equivalent to the written disclosure, and/or within the scope of skill or knowledge in the art. The above-described embodiments are intended to illustrate the best state for practicing the present disclosure, and it may also be possible to practice in other states known in the art to use other disclosures similar to the present disclosure, with various changes required in specific applications and uses of the present disclosure. Accordingly, the detailed description of the disclosure is not intended to limit the present disclosure to the disclosed embodiments. Also, the appended claims should be construed to include other embodiments as well.

The switching mode power supply according to the present disclosure may be used in various industrial fields such as inverters.

The invention claimed is:

1. A switching mode power supply comprising:
    a primary circuit unit comprising an input circuit proving an input voltage and a semiconductor switch conducting or cutting off the input circuit;
    a transformer comprising a primary winding connected to the primary circuit unit and a plurality of secondary windings magnetically connected to the primary winding and a bias winding magnetically connected to the plurality of secondary windings;
    a plurality of secondary circuit units respectively connected to the plurality of secondary windings and supplying a plurality of output voltages;
    a feedback circuit unit configured to receive one of the plurality of output voltages as feedback and calculating a compensation voltage for constantly controlling the output voltages;
    a control unit controlling on/off a duty ratio of the semiconductor switch according to the compensation voltage; and
    a protection circuit unit receiving one of the plurality of output voltages to determine whether the feedback circuit unit fails and configured to cutoff power of the control unit when the feedback circuit fails,
    wherein the protection circuit unit is connected in parallel with the feedback circuit unit,
    wherein the control unit, the feedback circuit unit, and the protection circuit unit are electrically connected to the bias winding to receive biased voltage induced from the secondary windings to the bias winding, and
    wherein the protection circuit unit is configured to disconnect power to the control unit by connecting the power of the protection circuit unit to ground when the feedback circuit unit fails.

2. The switching mode power supply of claim 1, wherein the protection circuit unit determines that the feedback circuit unit has failed when the output voltage received as feedback is equal to or greater than a reference voltage.

3. The switching mode power supply of claim 2, wherein the feedback circuit unit comprises:
    a first sensing unit detecting the output power received as feedback; and
    a calculation unit optically connected to the first sensing unit to receive the output power from the first sensing unit.

4. The switching mode power supply of claim 3, wherein the calculation unit calculates the compensation voltage corresponding to a difference between the output voltage and a target voltage.

5. The switching mode power supply of claim 4, wherein the control unit decreases the on/off duty ratio as the compensation voltage increases.

6. The switching mode power supply of claim 4, wherein the reference voltage is set to be greater than the target voltage.

7. The switching mode power supply of claim 1, wherein the protection circuit unit comprises:
    a second sensing unit detecting the output voltage received as feedback; and
    a determination unit optically connected to the second sensing unit to receive the output voltage from the second sensing unit.

* * * * *